United States Patent [19]
Guttenberger et al.

[11] Patent Number: 5,293,784
[45] Date of Patent: Mar. 15, 1994

[54] DRIVE DEVICE FOR A VEHICLE REAR-VIEW MIRROR

[75] Inventors: Richard Guttenberger, Greding; Werner Seichter, Georgensgmuend, both of Fed. Rep. of Germany

[73] Assignee: Gebruder Buhler Nachfolger GmbH, Nuremberg, Fed. Rep. of Germany

[21] Appl. No.: 940,049

[22] Filed: Sep. 3, 1992

[30] Foreign Application Priority Data

Sep. 6, 1991 [DE] Fed. Rep. of Germany ....... 4129626
Aug. 1, 1992 [DE] Fed. Rep. of Germany ....... 4225478

[51] Int. Cl.⁵ .................. G02B 7/198; F16H 55/00
[52] U.S. Cl. ........................ 74/425; 359/874; 384/203; 384/244; 403/282
[58] Field of Search ............... 74/89.14, 425; 29/453; 384/203, 204, 244; 403/122, 282; 359/874

[56] References Cited

U.S. PATENT DOCUMENTS

| | | | |
|---|---|---|---|
| 4,598,605 | 7/1986 | Manzoni | 74/501 M |
| 4,770,522 | 9/1988 | Alten | 248/485 X |
| 4,881,418 | 11/1989 | Fimeri | 74/425 X |
| 4,915,493 | 4/1990 | Fisher et al. | 350/634 |
| 4,940,321 | 7/1990 | Yoshida | 74/89.15 X |

Primary Examiner—Allan D. Herrmann
Attorney, Agent, or Firm—Mason, Fenwick & Lawrence

[57] ABSTRACT

The invention relates to a drive device for a vehicle rearview mirror, the positioning of which is achieved by means of a worm gear mounted by means of a coupling part in a single bearing, which is provided with an annular collar that engages in an upper annular slot of the coupling part. The intention is to improve the retaining force of the bearing. This is achieved according to the invention by providing that a cylindrical region provided with an upper and a lower guide surface adjoins the upper annular slot, the wall of the bearing surrounding the cylindrical region of the coupling part being disposed at a distance from the coupling part and guide surfaces corresponding to the guide surfaces of the coupling part being formed in the bearing, that the inside diameter of the annular collar is slightly smaller than the outside diameter of the cylindrical region of the coupling part, and that the angle that the inner face of the annular collar forms with the cross-sectional plane of the coupling part is in the range between 30° and 60°.

11 Claims, 3 Drawing Sheets

DRIVE DEVICE FOR A VEHICLE REAR-VIEW MIRROR

BACKGROUND OF THE INVENTION

The invention relates to a drive device for positioning a mirror-glass holder mounted pivotably in a mirror housing of a vehicle rear-view mirror, the drive device having at least one electric motor disposed in a housing consisting of upper and lower parts, the output shaft of the motor being drivingly engaged with a worm gear mounted rotatably and having limited tilting capability in the housing, the worm gear axially moving a nonrotatably supported positioning element, the free end of which is coupled flexibly with the mirror-glass holder, the worm gear being provided in the housing with only one single bearing, which elastically surrounds a coupling part seated at the center of the lower end face of the worm gear and engages positively with the said coupling part by means of an upper annular collar that is snapped into an upper annular slot of the coupling part.

Such a drive device is known from Manzoni U.S. Pat. No. 4,598,600. In this known device, the coupling part is constructed as a ball, which is molded integrally onto the worm-gear underside via a stalk-like nose. The bearing for holding the ball is a snap-in seat in the housing lower part, which consists of an annular wall provided on its upper inside face with a convexly protruding region, which overlaps the ball snapped into the bearing and supported against the bottom thereof, the overlap zone being a spherically annular surface.

In this known drive device, the retaining force of the bearing may not be sufficient in the presence of large pulling forces, as can occur if the positioning element is adjusted manually or encounters its end stop. The reason is that the inside diameter of the convexly protruding region is permitted to be only slightly smaller than the ball diameter of the coupling part, because otherwise its insertion into the bearing or release from the mold of the injection-molding die becomes impossible; the ball is therefore overlapped by the protruding region along a spherically annular surface located immediately above the ball equator. Consequently, the angle that the pulling direction on the one hand forms with the tangent at the point of the overlapped region located closest to the worm-gear axis on the other hand is necessarily predetermined and very acute, which means a small retaining force.

SUMMARY OF THE INVENTION

The object of the invention is to provide for a drive device of the type described in the introduction such that a secure seating of the worm gear in its single bearing will be ensured even if large pulling forces occur. This is achieved according to the invention by providing that a cylindrical region provided with an upper and a lower guide surface adjoins the upper annular slot, the wall of the bearing surrounding the cylindrical region of the coupling part being disposed at a distance from the coupling part and guide surfaces corresponding to the guide surfaces of the coupling part being formed in the bearing, that the inside diameter of the annular collar is slightly smaller than the outside diameter of the cylindrical region of the coupling part, and that the angle that the inner face of the annular collar forms with the cross-sectional plane of the coupling part is in the range between 30° and 60°.

On the basis of the cylindrical structure of the coupling part and the offset of the overlapped region toward the inside, i.e., into the contour of the cylinder, the angle between pulling direction and tangent at the point of the overlapped region located closest to the worm-gear axis is freely choosable, the limit of this free choice being determined solely by the requirement of releasibility from the mold of the injection-molding die. An optimum retaining force is ensured in the indicated angular range.

In order to ensure the greatest possible swiveling range of the worm gear, it is provided in a further embodiment of the invention that the inside diameter of the upper annular slot of the coupling part is substantially smaller than the inside diameter of the annular collar of the bearing.

In a first embodiment of the invention, the upper and the lower guide surfaces of the coupling part are formed as spherically convex annular surfaces adjoining the cylindrical region thereof. The coaxially disposed spherically annular surfaces have a common center.

In a second embodiment of the invention, the upper guide surface of the coupling part is formed as a spherically convex annular surface and the lower guide surface of the coupling part is formed as a concave spherical cap, which represents the closed end of a blind hole starting from the lower end face of the coupling part, a nose molded onto the lower part of the housing projecting into this blind hole, the upwardly directed surface of the nose being provided with a corresponding convex spherical cap. In this case also the spherically annular surface and spherical cap are coaxially disposed and have a common center, albeit located lower than in the first embodiment. By virtue of this lower pivot point, the swiveling range of the coupling part is smaller; moreover, the lower disposition of the pivot point permits the option of making the angle between inside face of the annular collar and cross-sectional plane of the coupling part very shallow or acute and thus increasing the retaining force.

In order to facilitate insertion of the coupling part into the bearing, it can be expedient to provide inwardly and downwardly directed chamfers adjoining the cylindrical region of the coupling part.

In a third embodiment of the invention, the coupling part is provided with an axially extending recess that starts from its lower end face and is surrounded by an annular wall. In this way, in a manner similar to that achieved in the upper region of the coupling part by means of the interplay of annular slot and annular collar, allowance is also made in the lower region of the coupling part for compensation of the tolerances that are unavoidable in the injection-molding technique.

In a further modification of this third embodiment, the annular wall has at least one slit running in the direction of the longitudinal axis or slightly inclined thereto; expediently, however, it is provided with three slits disposed at an angular spacing of 120°. The thickness and height of the annular wall are dimensioned to correspond to the requirements imposed on its elastic compliance.

In order to be able to introduce lubricant into the bearing or to remove excess lubricant from the bearing, an opening leading to the bearing is provided, according to a further advantageous feature of the invention, in the lower part of the housing.

Three practical examples of the invention are illustrated in drawings.

DESCRIPTION OF THE PREFERRED EMBODIMENTS

Figure 1:
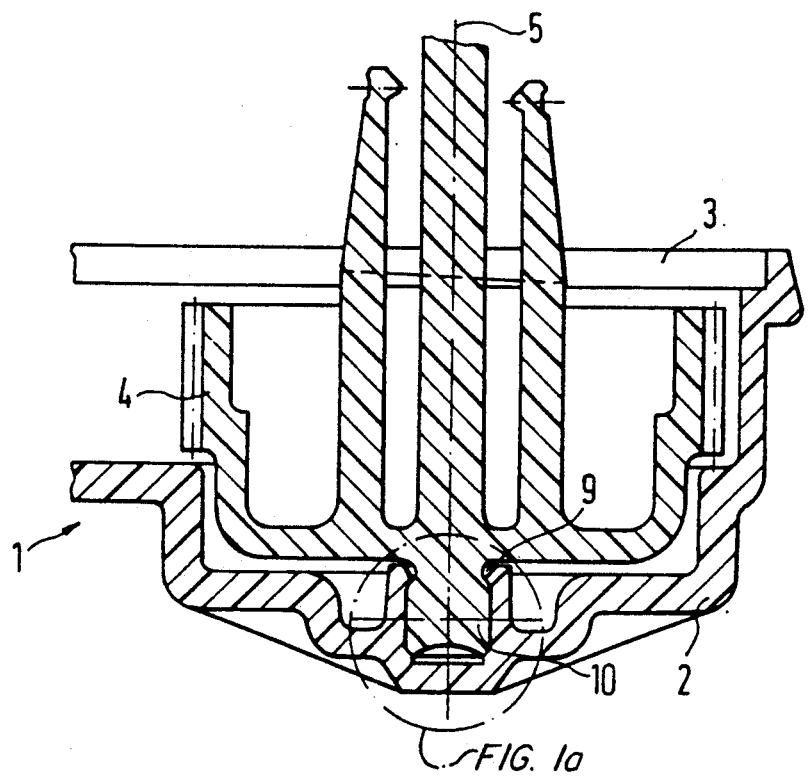
FIG. 1 shows, according to a first practical example of the invention, a longitudinal section through a worm gear inserted into the bearing.

The housing 1 holding the drive device only a partial region of which housing is shown in the drawing, consists of a cuplike lower part 2 divided into holders for the individual drive elements and an upper part 3 serving substantially as a cover. In the housing 1, a worm gear 4 is mounted rotatably and with limited tilting capability around its longitudinal axis 5; in the position shown, the worm gear 4 is upright, with vertically disposed longitudinal axis. The bearing of the worm gear 4 is formed as a snap-in seat in all three practical examples.

Figure 1A:
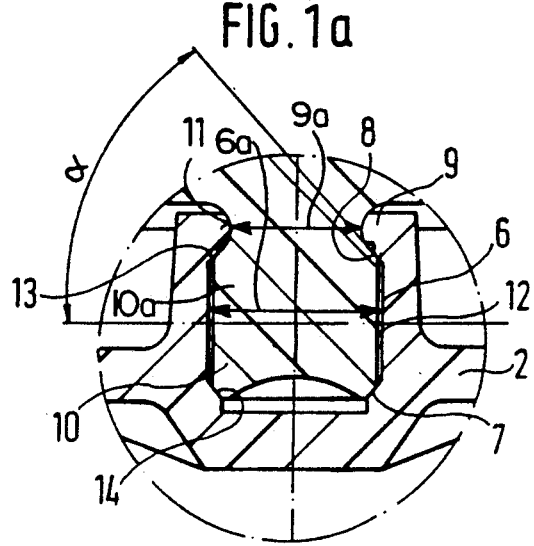
FIG. 1a shows an enlarged detail of the bearing region according to FIG. 1.

In the practical example according to FIG. 1 and 1a, the bearing consists of a cylindrical portion 6, having an inner diameter 6a and of lower and upper guide surfaces 7 and 8, which are formed as spherically concave annular surfaces, the upper guide surface 8 of which forms the inside face of an annular collar 9 having an inside diameter 9a protruding inwardly toward the inside wall of the cylindrical portion 6. In the bearing there is held a coupling part 10, which is seated at the center of the lower end face of the worm gear 4 and is integral therewith. The coupling part 10 is provided with an upper annular slot 11, adjoined by a cylindrical region 12. The coupling part 10 has a cylindrical part 10a that is substantially coextensive with the cylindrical region 12. In the lower inside face of the annular slot 11 and at the lower end of the coupling part 10, there are formed convex guide surfaces 13 and 14 corresponding with the guide surfaces 8 and 7 of the bearing, those surfaces 13 and 14 being coaxial and having a common center. A space permitting swiveling of the worm gear 4 is left free between the cylindrical portions 6 and the cylindrical region 12 of the bearing and of the coupling part 10.

Figure 2:
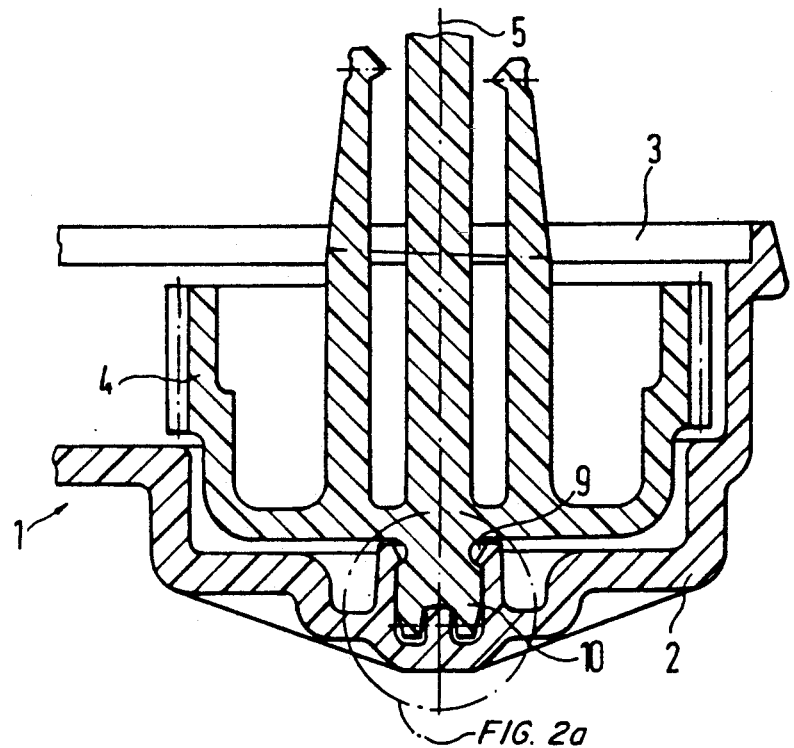
FIG. 2 shows, according to a second practical example of the invention, a longitudinal section through a worm gear inserted into the bearing.
Figure 2A:
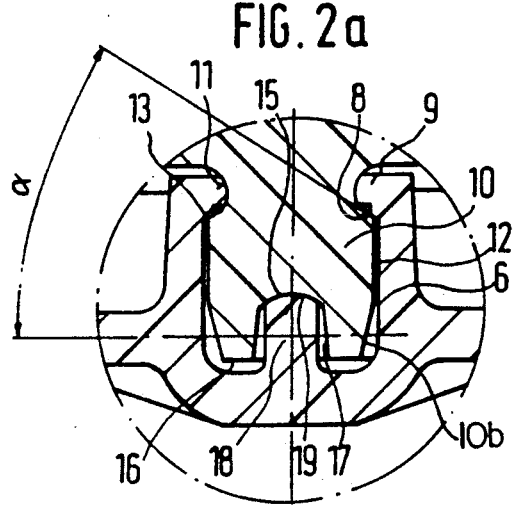
FIG. 2a shows an enlarged detail of the bearing region according to FIG. 2.
Figure 3:
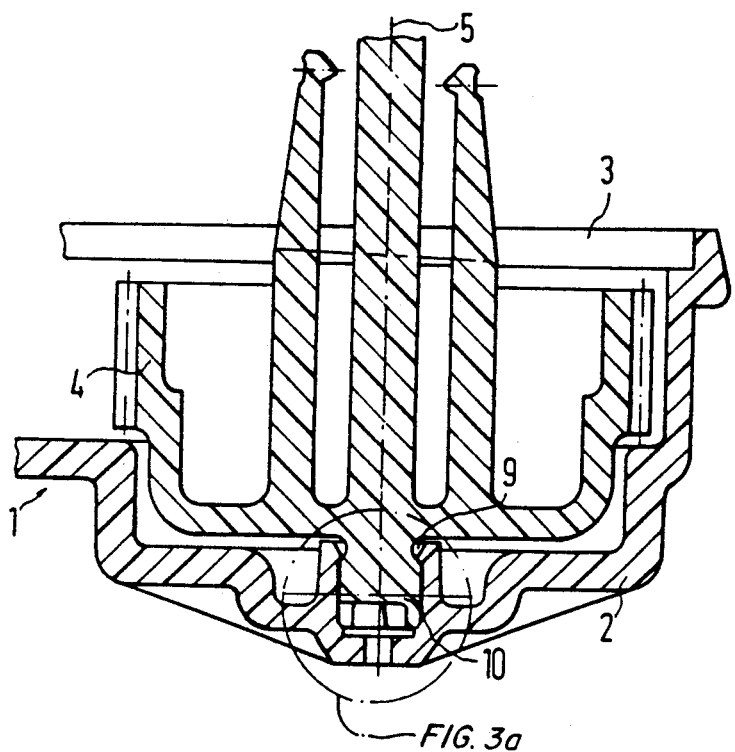
FIG. 3 shows, according to a third practical example of the invention, a longitudinal section through a worm gear inserted into the bearing.
Figure 3C:
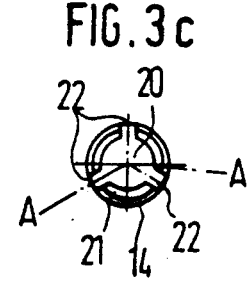
FIG. 3a shows an enlarged detail of the bearing region according to FIG. 3, and FIGS. 3b and 3c show a side view and an underside view of the coupling part of FIG. 3.
Figure 3B:
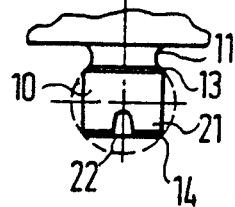
Figure 3A:
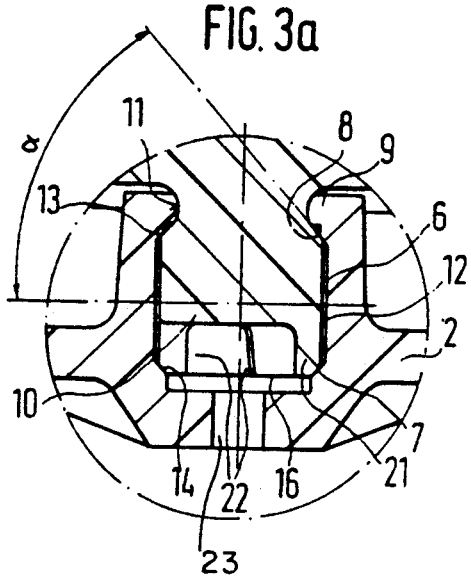

In the practical example according to FIGS. 2 and 2a, like symbols are used for like parts. In this practical example, the construction of the lower guide surface 15 is different; it is formed as a concave spherical cap, which forms the closed end of a blind hole 17 starting from the lower end face 16 of the coupling part 10. Into the blind hole 17 there projects a nose 18 that is molded onto the lower part 2 of the housing 1 and projects thereinto, the upper side of this nose representing a convex spherical cap 19 corresponding with the lower guide surface 15 of the coupling part 10. On the outside of the bottom of the coupling part 10 there is provided a circumferential chamfer 10b, which serves as a joining aid.

The angle between the inside face of the annular collar 9 and the cross-sectional plane of the coupling part 10 is represented by $\alpha$. In the practical example according to FIGS. 2 and 2a, the angle $\alpha$ is smaller than that in the practical example according to FIGS. 1 and 1a, meaning a larger retaining force.

Like symbols are also used for like parts in the practical example according to FIGS. 3, 3a, 3b and 3c. Starting from the lower end face 16 of the coupling part 10, a recess 20 extends axially, this recess being formed in the manner of a coaxial hole and having a surrounding annular wall 21, which is provided with the lower guide surface 14. The annular wall 21 is provided with three slits 22 disposed at an angular spacing of 120°. In the lower part 2 of the housing 1 there is provided an opening 23, the axis of which coincides with the bearing axis. The opening 23 facilitates introduction of lubricant into the bearing and removal of excess lubricant from the bearing.

We claim:

1. In a drive device for positioning the mirror holder of a vehicle rear-view mirror assembly,
   a worn gear adapted to be engaged by the output shaft of a motor;
   a housing;
   a single bearing for supporting said worm gear in said housing comprising:
   (i) a cylindrical portion comprising a cylindrical region extending from said housing, said cylindrical portion having a free end, an upper guide surface adjoining an end of said cylindrical region, and an annular inwardly extending collar at the free end of the cylindrical portion having a convex guide surface at the inner diameter thereof;
   (ii) a second guide surface carried by said housing;
   (iii) said worn gear having a coupling part attached thereto and including an annular slot having a concave annular surface,
   (iv) said collar extending into said annular slot with the convex guide surface thereof journalling the concave annular surface of said annular slot of said coupling part;
   (v) said coupling part extending beyond said annular slot and having a cylindrical part thereof substantially coextensive with said cylindrical region and spaced inwardly from said cylindrical region;
   (vi) said coupling part having guide surfaces engaging said guide surfaces of said cylinder and said housing;
   (vii) the inside diameter of the annular collar being slightly smaller than the outside diameter of the cylindrical part of the coupling part;
   (viii) the angle between a tangent to the part of the convex guide surface of the annular collar which is closest to said guide surface and the plane transverse to the axis of the coupling part being between 30° and 60°.

2. The drive device according to claim 1, wherein the inside diameter of the annular slot of the coupling part is substantially smaller than the inside diameter of the annular collar of the housing.

3. The drive device according to claim 1, wherein each of the guide surfaces of the coupling part is a spherically convex annular surface adjoining said cylindrical region of said coupling part.

4. The drive device according to claim 1, and a blind hole extending into said coupling part, the lower guide surface of the coupling part being a concave spherical cap at the inner end of said blind hole.

5. The drive device according to claim 4, wherein said housing comprises a nose projecting into said blind hole, said nose having a free end, said free end being convex and engaging said concave spherical cap.

6. The drive device according to claim 5, wherein inwardly and downwardly directed chamfers are adjacent the free end of the cylindrical part of the coupling part.

7. The drive device according to claim 1, wherein the coupling part comprises a lower face and an axially extending recess extending inwardly from said lower face to form an annular wall surrounding said recess, said wall extending from said lower face.

8. The drive device according to claim 7, wherein said annular wall has at least one slit extending substantially in the direction of the longitudinal axis of the coupling part or is slightly inclined to said longitudinal axis.

9. The drive device according to claim 8, wherein said annular wall is provided with three equally spaced slits.

10. The drive device according to claim 7, said annular wall being elastically deformable.

11. The drive device according to claim 8, further comprising an opening through said housing adjacent to said lower face of said coupling part.

* * * * *